US011009756B2

(12) United States Patent
Ina et al.

(10) Patent No.: US 11,009,756 B2
(45) Date of Patent: May 18, 2021

(54) DISPLAY DEVICE

(71) Applicant: SHARP KABUSHIKI KAISHA, Sakai (JP)

(72) Inventors: Keiichi Ina, Sakai (JP); Shuji Nishi, Sakai (JP); Takashi Satoh, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/664,238

(22) Filed: Oct. 25, 2019

(65) Prior Publication Data

US 2020/0142269 A1 May 7, 2020

Related U.S. Application Data

(60) Provisional application No. 62/755,711, filed on Nov. 5, 2018.

(51) Int. Cl.
| G02F 1/1362 | (2006.01) |
| G02F 1/1343 | (2006.01) |
| G02F 1/1335 | (2006.01) |
| G09G 3/36 | (2006.01) |

(52) U.S. Cl.
CPC .... *G02F 1/136286* (2013.01); *G02F 1/13439* (2013.01); *G02F 1/133553* (2013.01); *G02F 1/134336* (2013.01); *G02F 1/13624* (2013.01); *G02F 1/134345* (2021.01); *G02F 1/136295* (2021.01); *G02F 2201/123* (2013.01); *G09G 3/3614* (2013.01); *G09G 3/3648* (2013.01); *G09G 2300/0426* (2013.01); *G09G 2320/02* (2013.01)

(58) Field of Classification Search
CPC ......... G02F 1/136286; G02F 1/133553; G02F 1/134336; H01L 23/532171
See application file for complete search history.

(56) References Cited

U.S. PATENT DOCUMENTS

| 2009/0250704 | A1* | 10/2009 | Yamazaki | H01L 21/02631 |
| | | | | 257/72 |
| 2012/0154736 | A1 | 6/2012 | Nagasawa et al. | |
| 2012/0162594 | A1 | 6/2012 | Tamaki et al. | |
| 2016/0077394 | A1 | 3/2016 | Nagasawa et al. | |
| 2016/0079333 | A1* | 3/2016 | Shishido | H01L 27/3244 |
| | | | | 257/72 |
| 2016/0299399 | A1* | 10/2016 | Kitani | G02F 1/136286 |
| 2016/0351600 | A1* | 12/2016 | Moriwaki | G02F 1/1368 |
| 2017/0242310 | A1* | 8/2017 | Matsushima | G02F 1/134363 |
| 2017/0256649 | A1* | 9/2017 | Takamaru | H01L 29/78642 |
| 2017/0351129 | A1* | 12/2017 | Morimoto | G02F 1/1368 |

(Continued)

FOREIGN PATENT DOCUMENTS

JP 2012-145926 A 8/2012

*Primary Examiner* — Nathan W Ha
(74) *Attorney, Agent, or Firm* — ScienBiziP, P.C.

(57) ABSTRACT

A display device includes a reflective electrode, a driving circuit section, a wiring, and a wiring expansion section. The reflective electrode is divided into split electrodes arranged with spaces, which transmit light, respectively provided thereamong and reflects light. The driving circuit section drives the reflective electrode. The wiring is connected to at least the split electrodes and the driving circuit section and composed of a conductive material having a light transmission property. The wiring expansion section is formed to expand in the wiring to overlap the space.

13 Claims, 9 Drawing Sheets

(56) References Cited

U.S. PATENT DOCUMENTS

2017/0351153 A1* 12/2017 Mochizuki ............ G02F 1/1368
2018/0203307 A1*  7/2018 Nagasawa ........... G02F 1/13452
2018/0254293 A1*  9/2018 Okabe ................. H01L 27/1218

* cited by examiner

DISPLAY DEVICE

CROSS REFERENCE TO RELATED APPLICATION

This application claims priority from U.S. Provisional Patent Application No. 62/755,711 filed on Nov. 5, 2018. The entire contents of the priority application are incorporated herein by reference.

TECHNICAL FIELD

The technology described herein relates to a display device.

BACKGROUND

Conventionally, as an example of a display device, a display device described in Japanese Unexamined Patent Application Publication No. 2012-145926 has been known. In the display device described in the patent Document, a flattening film provided on a substrate in which a circuit section is formed is made to have a two-layer structure including first and second flattening films, and a metal wiring is formed between the two flattening films in the two-layer structure. The metal wiring electrically connects two sub-pixel electrodes disposed on the second flattening film to each other via a contact section formed in the second flattening film.

According to the display device described in the patent Document, described above, four gray scales can be represented by two bits using the two sub-pixel electrodes connected to each other by the metal wiring and another sub-pixel electrode. The display device performs reflective display using reflected light by each of the sub-pixel electrodes and transmissive display using transmitted light to be transmitted between the adjacent sub-pixel electrodes. In the transmissive display out of them, a space between the adjacent sub-pixel electrodes is smaller than the area of the sub-pixel electrode. Accordingly, a transmitted light amount at the time of the transmissive display tends to be smaller than a reflected light amount at the time of the reflective display.

Moreover, in the vicinity of the above-described space, an electric field directed toward a liquid crystal layer from each of the sub-pixel electrodes tends to be weaker than that in a central portion of the sub-pixel electrode. Accordingly, an orientation state of liquid crystal molecules included in the liquid crystal layer cannot be appropriately controlled, and the transmitted light amount is difficult to sufficiently ensure.

SUMMARY

The technology described herein has been completed based on the above-described circumstances, and is directed to improving a display quality related to transmissive display.

An aspect of the technology described herein is a display device including a reflective electrode that is divided into a plurality of split electrodes arranged with spaces, which transmit light, respectively provided thereamong and reflects light, a driving circuit section for driving the reflective electrode, a wiring connected to at least the split electrodes and the driving circuit section and composed of a conductive material having a light transmission property, and a wiring expansion section formed to expand in the wiring to overlap the space.

According to the technology described herein, a display quality related to transmissive display can be improved.

MODES FOR CARRYING OUT THE INVENTION

First Embodiment

A first embodiment of the technology described herein will be described with reference to FIG. 1 to FIG. 5. In the present embodiment, a semi-transmissive liquid crystal panel (display device) 10 included in a semi-transmissive liquid crystal display device will be illustrated as an example. An X-axis, a Y-axis, and a Z-axis are illustrated in a part of each of the drawings, and are drawn such that a direction along each of the axes is a direction illustrated in each of the drawings.

Figure 1:
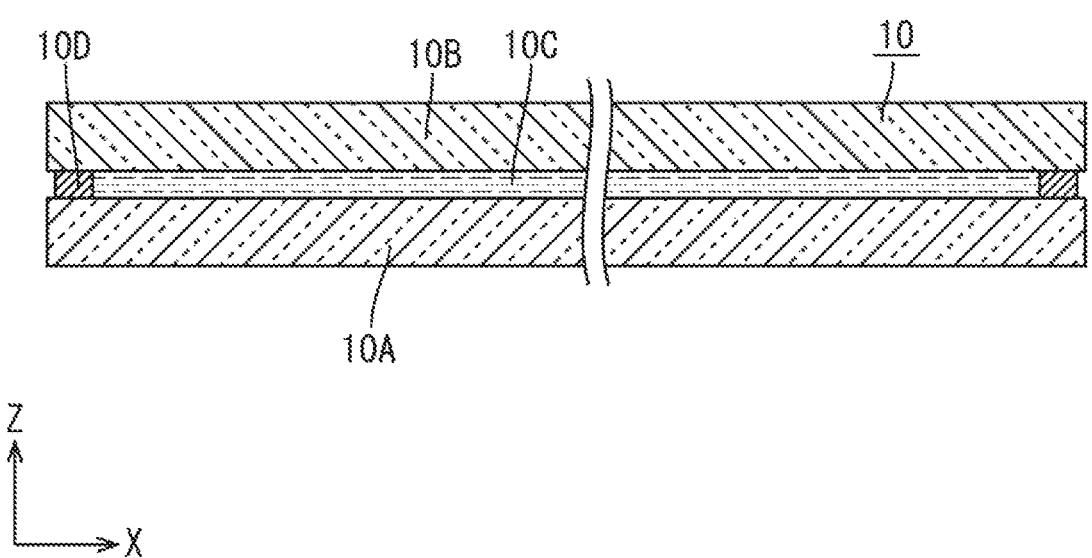
FIG. 1 is a schematic sectional view of a semi-transmissive liquid crystal panel included in a semi-transmissive liquid crystal display device according to a first embodiment.

The semi-transmissive liquid crystal display device includes the semi-transmissive liquid crystal panel 10 that displays an image, and a backlight device (lighting device) that irradiates light onto the semi-transmissive liquid crystal panel 10, as illustrated in FIG. 1. The semi-transmissive liquid crystal panel 10 can perform both reflective display used for display by reflecting external light (ambient light or environmental light) and transmissive display used for display by transmitting light (backlight) to be irradiated from the backlight device. The external light used in the reflective display includes solar light and interior light, for example. The backlight device includes a light source (e.g., an LED) that is arranged on the back surface side (the lower side illustrated in FIG. 1) of the semi-transmissive liquid crystal panel 10 and emits light in white (white light), an optical member that gives an optical function to the light from the light source to convert the light into planar light, and the like.

Figure 2:
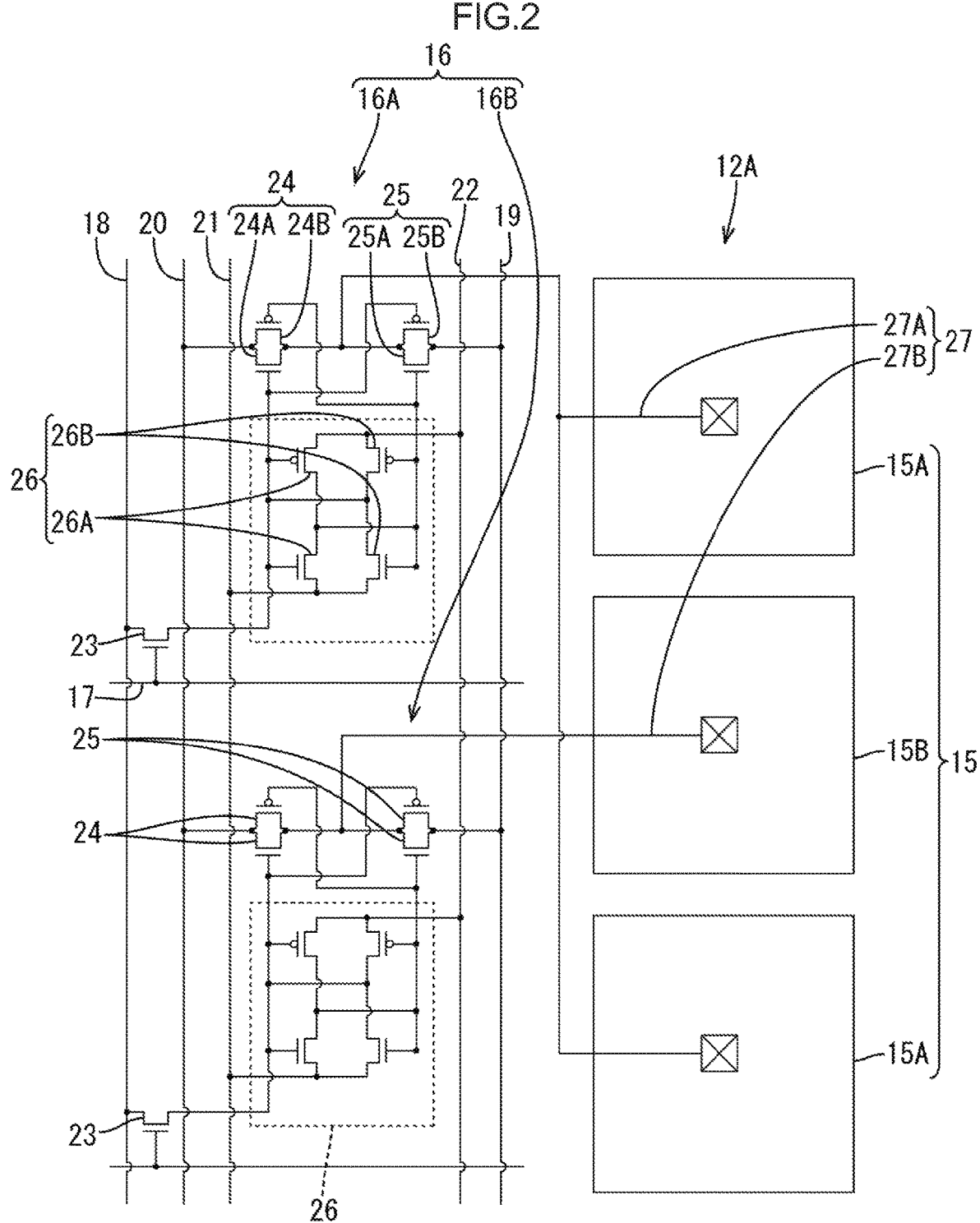
FIG. 2 is a circuit diagram illustrating an electrical configuration of a memory included in a pixel section in the semi-transmissive liquid crystal panel.

The semi-transmissive liquid crystal panel 10 will be described in detail. First, the semi-transmissive liquid crystal panel 10 is brought into a normally black mode in which a light transmittance reaches a minimum with no electric field occurring in a liquid crystal layer 10C. The semi-transmissive liquid crystal panel 10 includes at least a pair of substrates 10A and 10B, the liquid crystal layer 10C including liquid crystal molecules as a substance that changes in optical characteristic as an electric field is applied by being sandwiched between the pair of substrates 10A and 10B, and a seal section 10D that is interposed between the pair of substrates 10A and 10B and is disposed in a shape surrounding the liquid crystal layer 10C while sealing the liquid crystal layer 10C. Out of the pair of substrates 10A and 10B, the substrate on the front surface side (external light incidence side) is set as a counter substrate (CF substrate) 10B, and the substrate on the rear surface side (backlight device side) is set as an array substrate 10A. In the semi-transmissive liquid crystal panel 10, a central side portion of its display surface is a display region provided with a pixel section 11 for displaying an image. Although illustration of the pixel section 11 is omitted in FIG. 1, the pixel section 11 is illustrated in FIG. 2 and subsequent drawings. The pixel section 11 includes a plurality of pixel sections 11 and a plurality of pixel sections 11 each planarly arranged in a matrix shape, respectively, in an X-axis direction and a Y-axis direction in the display region. The pixel section 11 includes a reflective electrode 12 that is provided on the side of the array substrate 10A and reflects light and a color filter 13 that is provided on the side of the counter substrate 10B and is arranged to overlap the reflective electrode 12 and exhibits a red color, a green color, and a blue color (see FIG. 5), illustration of which is omitted in FIG. 1. The reflective electrode 12 has its surface composed of a metal film excellent in light reflectivity and hardly transmits light. Therefore, the reflective electrode 12 can reflect external light incident via the counter substrate 10B and the liquid crystal layer 10C to be directed toward the front surface side, and contributes to reflective display. The color filter 13 includes color filters 13 each exhibiting three colors, red, green, and blue repeatedly arranged in the X-axis direction. The counter substrate 10B is provided with a counter electrode 14 disposed in a solid shape over a substantially entire area of the display region (see FIG. 5). In the present embodiment, the counter electrode 14 is driven in a so-called common inversion system because a common potential a polarity of which is reversed for each frame is supplied to the counter electrode 14. When the reflective electrode 12 is charged, an electric field corresponding to a potential difference occurring between the reflective electrode 12 and the counter electrode 14 is generated in the liquid crystal layer 10C. An orientation state of liquid crystal molecules included in the liquid crystal layer 10C is controlled by the above-described electric field. As a result, an emitted light amount can be controlled depending on the orientation state of the liquid crystal layer 10C for each of the plurality of pixel sections 11 so that color display can be performed.

The semi-transmissive liquid crystal panel 10 according to the present embodiment is of an MIP (memory in pixel) type in which each of the pixel sections 11 includes a memory capable of storing data. A circuit configuration of the memory included in the pixel section 11 will be described with reference to FIG. 2. First, the reflective electrode 12 constituting the pixel section 11 includes three split electrodes 15 obtained by division, as illustrated in FIG. 2. Among the three split electrodes 15, the two split electrodes 15 are electrically short-circuited to each other while the remaining one split electrode 15 is electrically independent of the two split electrodes 15 short-circuited to each other. Hereinafter, when the three split electrodes 15 are distinguished, the two split electrodes short-circuited to each other respectively have symbols assigned a suffix A as a "first split electrode", the remaining one split electrode has a symbol assigned a suffix B as a "second split electrode", and the split electrodes 15 respectively have symbols not assigned suffixes when not collectively referred to without being distinguished. Since the respective areas of the three split electrodes 15 are made to substantially equal, an area ratio of the two first split electrodes 15A to the one second split electrode 15B is "2:1".

The array substrate 10A is provided with a driving circuit section 16 connected to the reflective electrode 12 for driving the reflective electrode 12 and various types of wirings 17 to 22 to be connected to the driving circuit section 16, as illustrated in FIG. 2. The driving circuit section 16 includes a first driving circuit section 16A to be connected to the two first split electrodes 15A constituting the reflective electrode 12 and a second driving circuit section 16B to be connected to the one second split electrode 15B. That is, the two driving circuit sections 16A and 16B are connected to the one reflective electrode 12. Hereinafter, when the two driving circuit sections 16 are distinguished, the driving circuit section 16 to be connected to the first split electrodes 15A has a symbol assigned a suffix A as a "first driving circuit section", the driving circuit section 16 to be connected to the second split electrode 15B has a symbol assigned a suffix B as a "second driving circuit section", and the driving circuit sections 16 respectively have symbols not assigned suffixes when not collectively referred to without being distinguished. The various types of wirings 17 to 22 include the gate line 17 to which a scanning signal is transmitted, the source line 18 to which a data signal is transmitted, the in-phase control wiring 19 to which a control pulse in phase with the common potential of the counter electrode 14 is transmitted, the reversed-phase control wiring 20 to which a control pulse in phase with the common potential of the counter electrode 14 is transmitted, a positive electrode-side power supply wiring 21 to which a power supply signal having a positive polarity is transmitted, and a negative electrode-side power supply wiring 22 to which a power supply signal having a negative polarity is transmitted.

The driving circuit section 16 includes three switch elements 23 to 25 and a latch section (potential holding section) 26, as illustrated in FIG. 2. The three switch elements 23 to 25 include the first switch element 23 to be connected to the gate line 17, the source line 18, and the latch section 26, the second switch element 24 to be connected to the reversed-phase control wiring 20, the reflective electrode 12 (the first split electrode 15A or the second split electrode 15B), and the latch section 26, and the third switch element 25 to be connected to the in-phase control wiring 19, the reflective electrode 12, and the latch section 26. The first switch element 23 is composed of a known transistor, and has its gate electrode, source electrode, and drain electrode respectively connected to the gate line 17, the source line 18, and the latch section 26. The second switch element 24 and the third switch element 25 are respectively composed of transfer switches formed by connecting NchMOS transistors 24A and 25A and PchMOS transistors 24B and 25B in parallel. The positive electrode-side power supply wiring 21 and the negative electrode-side power supply wiring 22 are connected in addition to the above-described three switch elements 23 to 25 to the latch section 26. The positive electrode-side power supply wiring 21 and the negative electrode-side power supply wiring 22 are connected in addition to the above-described three switch elements 23 to 25 to the latch section 26. The latch section 26 includes inverters 26A and 26B connected in parallel in opposite directions to each other, and holds a potential corresponding to a data signal transmitted by the source line 18 accepted by the first switch element 23. The two inverters 26A and 26B constituting the latch section 26 include an NchMOS inverter 26A and a PchMOS inverter 26B, and are configured to have their respective gate electrodes and drain electrodes connected in common. Either one of the second switch elements 24 and the third switch element 25 is turned on and the other switch element is turned off depending on a polarity of the potential held by the latch section 26. A control pulse in phase with or a control phase in opposite phase to the common potential of the counter electrode 14 to be supplied from the in-phase control wiring 19 or the reversed-phase control wiring 20 connected to the switch element, which has been turned on, out of the second switch element 24 and the third switch element 25 is supplied to the first split electrode 15A or the second split electrode 15B constituting the reflective electrode 12. As a result, the first split electrode 15A or the second split electrode 15B constituting the reflective electrode 12 is charged to a voltage corresponding to the control pulse.

The first driving circuit section 16A included in the driving circuit section 16 can charge the two first split electrodes 15A constituting the reflective electrode 12 to a voltage corresponding to the control pulse in phase with or the control pulse in opposite phase to the common potential of the counter electrode 14. Similarly, the second driving circuit section 16B can charge the one second split electrode 15B to a voltage corresponding to the control pulse in phase with or the control pulse in opposite phase to the common potential of the counter electrode 14. When the split electrode 15 is charged to the voltage corresponding to the control pulse in phase with the common potential, a potential difference between the counter electrode 14 and itself becomes substantially zero. Therefore, an electric field does not occur between the split electrode 15 and the counter electrode 14 so that a light transmittance reaches a minimum. On the other hand, when the split electrode 15 is charged to a voltage corresponding to the control pulse in opposite phase to the common potential, a potential difference occurs between the counter electrode 14 and itself, and an electric field occurs between the split electrode 15 and the counter electrode 14. Therefore, a light transmittance reaches a maximum. Thus, the two first split electrodes 15A and the one second split electrode 15B among the three split electrodes 15 constituting the reflective electrode 12 can be driven in two bits. Therefore, the number of display gray scales in the pixel section 11 is "4".

Figure 3:
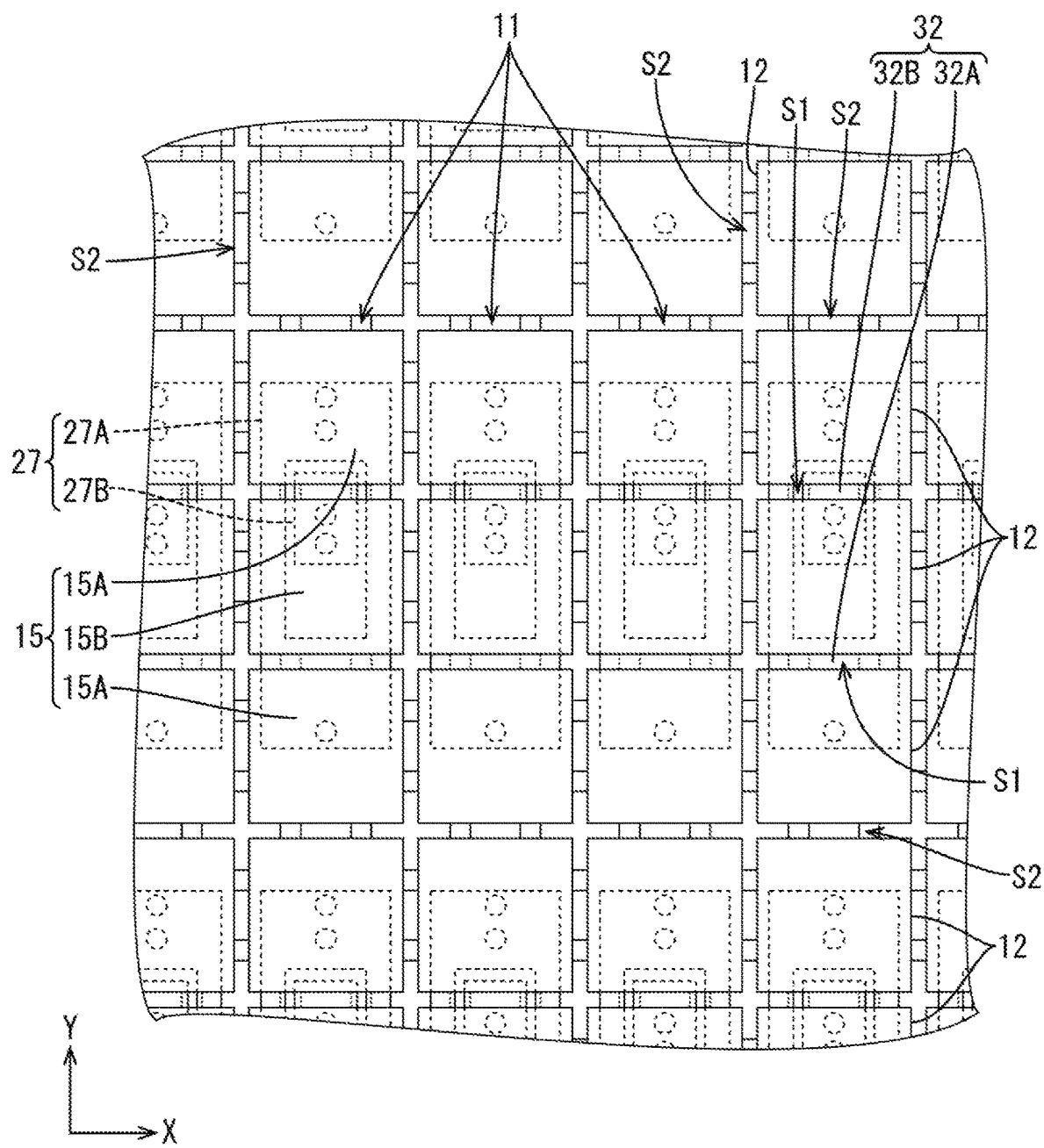
FIG. 3 is a plan view illustrating an arrangement of pixel sections in an array substrate constituting the semi-transmissive liquid crystal panel.

An arrangement of the pixel sections 11 in the array substrate 10A will be described below with reference to FIG. 3 and FIG. 4. In the display region of the array substrate 10A, the plurality of reflective electrodes 12 and the plurality of reflective electrodes 12 that constitute the pixel section 11 are respectively planarly arranged in a matrix shape with spaces (second spaces) S2 provided thereamong in the X-axis direction and the Y-axis direction, as illustrated in FIG. 3. The three split electrodes 15 constituting the reflective electrode 12 are disposed side by side with spaces S1 provided thereamong in the Y-axis direction, and the second split electrode 15B is arranged to be sandwiched between the two first split electrodes 15A. In the present embodiment, a width dimension (an arrangement pitch of the split electrodes 15) W1 of the space S1 provided between the adjacent split electrodes 15 constituting the one reflective electrode 12 is substantially the same as a width dimension (an arrangement pitch of the reflective electrodes 12) W2 of the space S2 provided between the adjacent reflective electrodes 12. The reflective electrode 12 is composed of a metal film, as already described, and functions to perform reflective display by reflecting external light while almost blocking out light to be irradiated from the backlight device at the time of transmissive display. Therefore, light to be irradiated from the backlight device at the time of transmissive display is used for transmissive display by passing through the spaces S1 and S2 respectively provided between the adjacent split electrodes 15 constituting the one reflective electrode 12 and between the adjacent reflective electrodes 12, i.e., a region that does not overlap the reflective electrodes 12 (the split electrodes 15).

Figure 4:
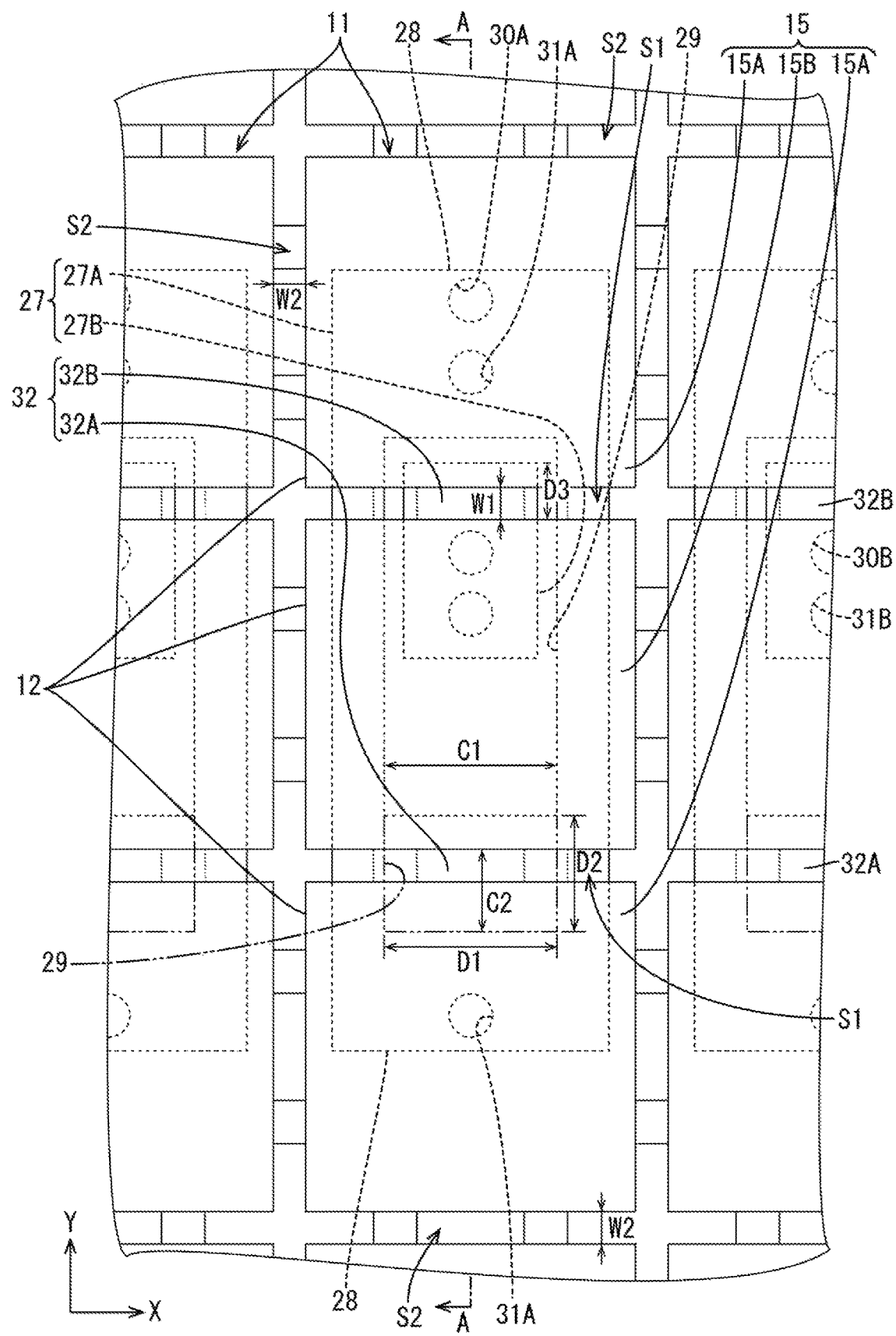
FIG. 4 is an enlarged view of FIG. 3.

The display region of the array substrate 10A is provided with a wiring 27 to be connected to the split electrode 15 and the driving circuit section 16, as illustrated in FIG. 4. The driving circuit section 16 is arranged to overlap the split electrode 15 on the lower layer side. The wiring 27 is composed of a conductive material (transparent electrode material) having a light transmission property such as an ITO (indium tin oxide) or ZnO (zinc oxide). The wiring 27 includes a first wiring 27A to be connected to the first split electrodes 15A and the first driving circuit section 16A and a second wiring 27B to be connected to the second split electrode 15B and the second driving circuit section 16B. Hereinafter, when the two wirings 27 are distinguished, the wiring to be connected to the first split electrodes 15A and the first driving circuit section 16A has a symbol assigned a suffix A as a "first wiring", the wiring to be connected to the second split electrode 15B and the second driving circuit section 16B has a symbol assigned a suffix B as a "second wiring", and the wirings respectively have symbols not assigned suffixes when not collectively referred to without being distinguished. The first wiring 27A and the second wiring 27B are composed of the same conductive material and are disposed in the same layer.

The first wiring 27A is connected to each of the two first split electrodes 15A and short-circuits the first split electrodes 15A to each other, as illustrated in FIG. 4. As already described, the two split electrodes 15A are arranged with the second split electrode 15B sandwiched therebetween in the Y-axis direction. Thus, the first wiring 27 to be connected to the first split electrodes 15A is arranged in a form straddling the two spaces S1 provided between the two first split electrodes 15A and the second split electrode 15B. Since the first wiring 27 is composed of a conductive material having a light transmission property, the first wiring 27 is avoided preventing light that passes through the above-described two spaces S1 at the time of transmissive display. More specifically, the first wiring 27A includes two electrode connection sections 28 to be respectively connected to the two first split electrodes 15A and a pair of wiring branch sections 29 branching from each of the electrode connection sections 28 and extending in the Y-axis direction. The two electrode connection sections 28 are disposed to respectively overlap central portions in the X-axis direction and the Y-axis direction in the two first split electrodes 15A. The paired wiring branch sections 29 are disposed to be spaced apart from each other in the X-axis direction, and ends in an extension direction of each of the wiring branch sections 29 respectively connect with the two electrode connection sections 28. Each of the pair of wiring branch sections 29 extends in the Y-axis direction from the one first split electrode 15A to reach the other first split electrode 15A, and is arranged to straddle the second split electrode 15B over its entire length in the middle of the extension while straddling the two spaces S1. The paired wiring branch sections 29 respectively connect with both ends in the X-axis direction of each of the two electrode connection sections 28, and are respectively disposed to overlap both end side portions in the X-axis direction of each of the first split electrodes 15A and the second split electrode 15B. The second wiring 27B is disposed such that its large part overlaps the second split electrode 15B as a connection target. The second wiring 27B extends in the Y-axis direction while being disposed to overlap a central side portion in the X-axis direction of the second split electrode 15B. Therefore, the second wiring 27B is arranged to be sandwiched between the pair of wiring branch sections 29 in the X-axis direction. The second wiring 27B and each of the pair of wiring branch sections 29 are spaced apart from each other by a predetermined width to avoid a short circuit. Detailed illustration of the various types of wirings 17 to 22 already described in FIG. 3, excluding a portion schematically illustrated (a portion exposed to the spaces S1 and S2 between the reflective electrodes 12 and between the split electrodes 15), is omitted.

Figure 5:
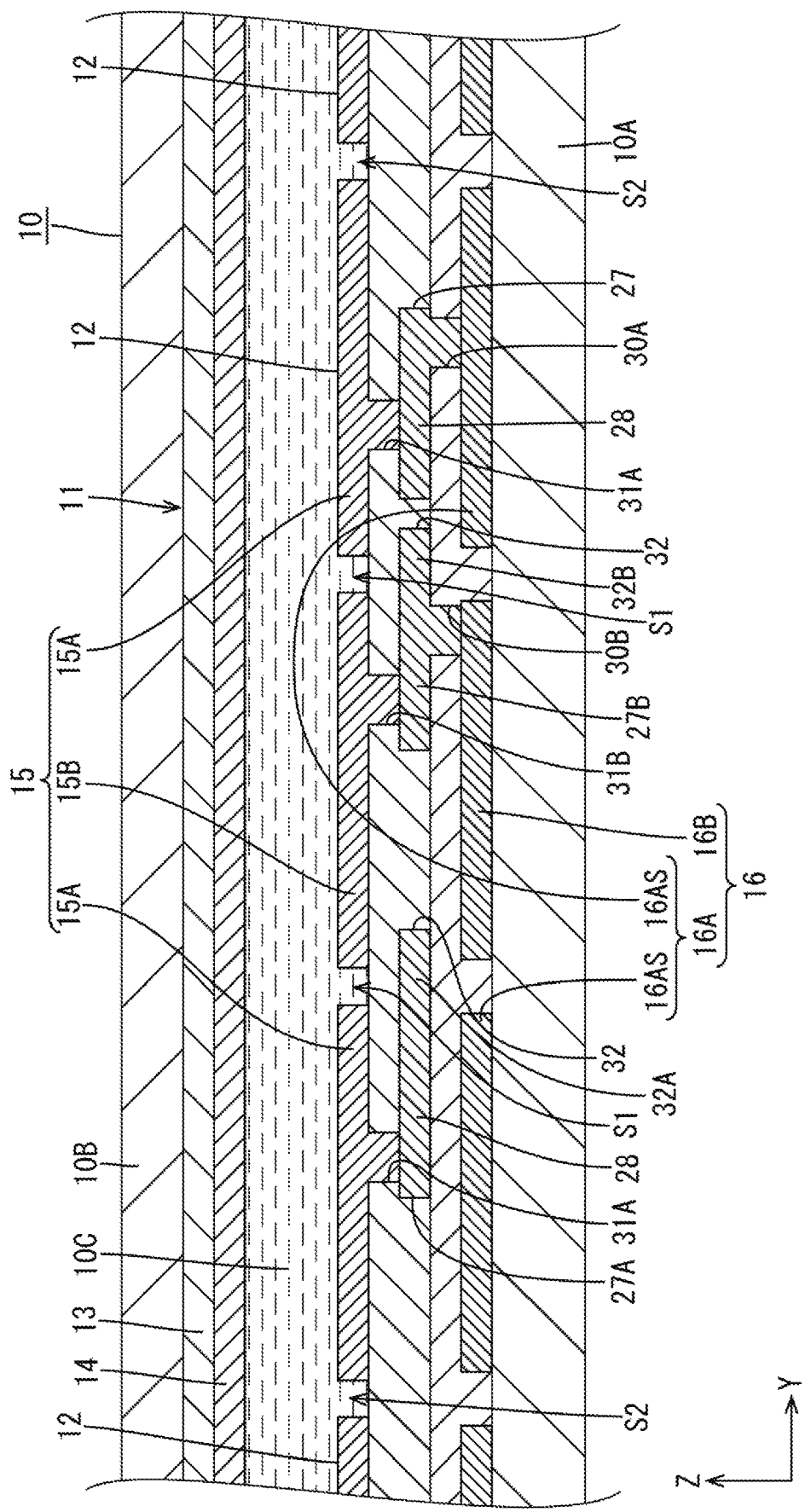
FIG. 5 is a cross-sectional view taken along a line A-A illustrated in FIG. 4.

Then, a cross-sectional configuration of the pixel section 11 will be described with reference to FIG. 5. The driving circuit section 16 is disposed to overlap each of the split electrodes 15 constituting the reflective electrode 12, as illustrated in FIG. 5. The first driving circuit section 16A is divided into two split first driving circuit sections 16AS to respectively overlap the two first split electrodes 15A. The two split first driving circuit sections 16AS are connected to each other via a wiring. The second driving circuit section 16B is disposed to overlap the second split electrode 15B, and is arranged to be sandwiched between the two split first driving circuit sections 16AS in the Y direction. The driving circuit section 16 is disposed on the lower layer side (on the opposite side to the side of the liquid crystal layer 10C) of the wiring 27 via a first insulating film 30. At a position overlapping both one of the two split first driving circuit sections 16A and one of the electrode connection sections 28 in the first wiring 27A in the first insulating film 30, a first contact hole 30A that connects both the split first driving circuit section 16AS and the electrode connection section 28 is formed to open. At a position overlapping both the second driving circuit section 16B and the second wiring 27B in the first insulating film 30, a second contact hole 30B that connects both the second driving circuit section 16B and the second wiring 27B is formed to open. The reflective electrode 12 is disposed on the upper layer side (on the side of the liquid crystal layer 10C) of the wiring 27 via a second insulating film 31. At a position overlapping the two first split electrodes 15A and the two electrode connection sections 28 in the first wiring 27A and not overlapping the first contact hole 30A in the second insulating film 31, two third contact holes 31A that connect the one first split electrode 15A and the one electrode connection section 28 while connecting the other first split electrode 15A and the other electrode connection section 28 are formed to open. At a position overlapping both the second split electrode 15B and the second wiring 27B and not overlapping the second contact hole 30B in the second insulating film 31, a fourth contact hole 31B that connects the second split electrode 15B and the second wiring 27B is formed to open.

In the semi-transmissive liquid crystal panel 10 in the present embodiment, reflective display to be performed upon reflecting external light by the reflective electrode 12 is a principal display method. Thus, an area ratio of the reflective electrode 12 to the display region is high. On the other hand, an area ratio of the space S1 between the adjacent split electrodes 15 and the space S2 between the adjacent reflective electrodes 12 to the display region is lower than the area ratio of the reflective electrodes 12. Accordingly, transmissive display to be performed by using light from a backlight device that has been transmitted by each of the above-described spaces S1 and S2 tends to be dark. Moreover, in the vicinity of the space S1 between the adjacent split electrodes 15, an electric field occurring between the counter electrodes 14 and the split electrode 15 tends to be weak as the reflective electrode 12 is charged. As a result, in the vicinity of the space S1 between the adjacent split electrodes 15, an orientation state of liquid crystal molecules included in the liquid crystal layer 10C is difficult to appropriately control, and a transmitted light amount in the vicinity of the space S1 is difficult to sufficiently ensure, presenting a problem that transmissive display becomes darker.

The wiring 27 according to the present embodiment is provided with a wiring expansion section 32 formed to expand to overlap the space S1 provided between the adjacent split electrodes 15, as illustrated in FIG. 4 and FIG. 5. Since the wiring 27 is composed of a conductive material having a light transmission property as already described, the wiring expansion section 32 is avoided preventing light that is transmitted by the space S1 even if the wiring expansion section 32 is formed to expand to overlap the space S1. Since a signal to be fed to the reflective electrode 12 from the driving circuit section 16 via the wiring 27 is fed to the wiring expansion section 32, a sufficient electric field can be generated between the counter electrode 14 and the split electrode 15 in the space S1 between the adjacent split electrodes 15. As a result, in the vicinity of the space S1 between the adjacent split electrodes 15, the orientation state of the liquid crystal molecules included in the liquid crystal layer 10C can also be appropriately controlled, and the transmitted light amount in the vicinity of the space S1 can be sufficiently ensured. As described above, transmissive display can be made bright so that an excellent display quality is obtained.

In the present embodiment, the wiring expansion sections 32 are respectively provided in the first wiring 27A and the second wiring 27B, as illustrated in FIG. 4 and FIG. 5. Hereinafter, when the two wiring expansion sections 32 are distinguished, the wiring expansion section 32 provided in the first wiring 27A has a symbol assigned a suffix A as a "first wiring expansion section", the wiring expansion section 32 provided in the second wiring 27B has a symbol assigned a suffix B as a "second wiring expansion section", and the wiring expansion sections 32 respectively have symbols not assigned suffixes when collectively referred to without being distinguished.

The first wiring expansion section 32A is provided in the first wiring 27A to expand toward the second split electrode 15B in the Y-axis direction from the side of the first split electrode 15A positioned on the lower side of FIG. 4, as illustrated in FIG. 4. The first wiring expansion section 32A is provided to straddle the electrode connection section 28 positioned on the lower side of FIG. 4 and the pair of wiring branch sections 29. FIG. 4 illustrates respective boundary lines between the electrode connection section 28 and the wiring branch sections 29 and the first wiring expansion section 32A by two-dot and dash lines to clarify a formation range of the first wiring expansion section 32A. The first wiring expansion section 32A has a dimension D1 in the X-axis direction being equal to a spacing C1 between the pair of wiring branch sections 29, and connects with side edges on the inner side of the pair of wiring branch sections 29. The first wiring expansion section 32A has a dimension D2 in the Y-axis direction being larger than a spacing C2 between the electrode connection section 28 positioned on the lower side of FIG. 4 and the second split electrode 15B. Therefore, the first wiring expansion section 32A is arranged to overlap the space S1 between the first split electrode 15A positioned on the lower side of FIG. 4 and the second split electrode 15B over its entire width. According to such a configuration, when a signal to be fed to the first split electrode 15A from the first driving circuit section 16A via the first wiring 27A is fed to the first wiring expansion section 32A, a sufficient electric field can be generated in the space S1 between the adjacent split electrodes 15A and 15B. Moreover, the first wiring expansion section 32A is provided to straddle the pair of wiring branch sections 29. Accordingly, a coverage of the first wiring expansion section 32A with respect to the space S1 provided between the adjacent split electrodes 15A and 15B becomes good. Moreover, the first wiring expansion section 32A is disposed such that its part overlaps an end in the Y-axis direction of the second split electrode 15B. Therefore, reliability with which the first wiring expansion section 32A can be made to overlap the above-described space S1 over the entire width so that the above-described coverage of the first wiring expansion section 32A with respect to the space S1 becomes better. As a result, a sufficient electric field can be generated over a wider range in the space S1 between the adjacent split electrodes 15A and 15B so that a larger transmitted light amount in the space S1 can be ensured.

The second wiring expansion section 32B is provided in the second wiring 27B to expand toward the first split electrode 15A positioned on the upper side of FIG. 4 in the Y-axis direction from the side of the second split electrode 15B, as illustrated in FIG. 4. The second wiring expansion section 32B connects with an end on the upper side of FIG. 4 of the second wiring 27B. The second wiring expansion section 328 has the same width as that of the second wiring 27B, and is obtained by extending the second wiring 27B inherently sufficient to be disposed to overlap the second split electrode 15B. The second wiring expansion section 32B has a dimension D3 in the Y-axis direction being larger than a width dimension W1 of the space S1 between the second split electrode 15B and the electrode connection section 28 positioned on the upper side of FIG. 4. Therefore, the second wiring expansion section 32B is arranged to overlap the above-described space S1 over its entire width. Such a configuration enables a sufficient electric field to be generated in the space S1 between the adjacent split electrodes 15A and 15B when a signal to be fed to the second split electrode 158 from the second driving circuit section 16B via the second wiring 278 is fed to the second wiring expansion section 328. The second wiring 27B is disposed to be spaced apart from the pair of wiring branch sections 29 branched to sandwich itself to prevent a short circuit with the first wiring 27A, as described above. Accordingly, an arrangement space of the second wiring 278 is limited. In this respect, the second wiring 27B is provided with the second wiring expansion section 32B having the above-described configuration. Thus, an arrangement space of the second wiring 27B including the second wiring expansion section 32B can be sufficiently ensured. As a result, a configuration (the second contact hole 30B and the fourth contact hole 31B) for connecting the second wiring 27B to the second split electrode 15B and the second driving circuit section 16B can be designed with allowance. Moreover, the second wiring expansion section 32B has its part disposed to overlap an end in the Y-axis direction of the first split electrode 15A positioned on the upper side of FIG. 4. Therefore, reliability with which the second wiring expansion section 32B can be made to overlap the space S1 between the second split electrode 15B and the electrode connection section 28 positioned on the upper side of FIG. 4 over the entire width becomes high so that a coverage of the second wiring expansion section 32B with respect to the space S1 becomes better. As a result, a sufficient electric field can be generated over a wider range in the space S1 between the adjacent split electrodes 15A and 15B so that a larger transmitted light amount in the space S1 can be ensured.

As described above, the semi-transmissive liquid crystal panel (display device) 10 according to the present embodiment includes the reflective electrode 12 that is divided into the plurality of split electrodes 15 arranged with the spaces S1, which transmit light, respectively provided thereamong and reflects light, the driving circuit section 16 for driving the reflective electrode 12, the wiring 27 that is connected to at least the split electrodes 15 and the driving circuit section 16 and is composed of a conductive material having a light transmission property, and the wiring expansion section 32 that is formed to expand in the wiring 27 to overlap the spaces S1.

As a result, when a signal to be outputted from the driving circuit section 16 is fed to the reflective electrode 12 from the wiring 27, the reflective electrode 12 is charged to a predetermined potential. When light is reflected by the reflective electrode 12, reflective display using external light can be performed. On the other hand, since the reflective electrode 12 is divided into the plurality of split electrodes 15 arranged with the spaces S1 respectively provided thereamong, transmissive display can be performed by using light to be transmitted by the space S1 between the adjacent split electrodes 15. In the transmissive display, an electric field that occurs as the reflective electrode 12 is charged tends to be weaker in the space S1 between the adjacent split electrodes 15 so that a transmitted light amount is more difficult to sufficiently ensure than in the central portion of the split electrode 15. In this respect, the wiring expansion section 32 is disposed to overlap the space S1 between the adjacent split electrodes formed to expand in the wiring 27 composed of the conductive material having a light transmission property. Accordingly, the wiring expansion section 32 itself can transmit light in transmissive display while a signal to be fed to the reflective electrode 12 from the driving circuit section 16 via the wiring 27 is also fed to itself so that a sufficient electric field can be generated in the space S1 between the adjacent split electrodes 15. As a result, a transmitted light amount of light to be transmitted by the space S1 between the adjacent split electrodes 15 can be sufficiently ensured at the time of transmissive display so that an excellent display quality is obtained.

The reflective electrode 12 is divided such that the number of the split electrodes 15 is at least three, the wiring 27 includes the first wiring 27A to be connected to the two split electrodes 15 included among the at least three split electrodes 15 and the driving circuit section 16 and the second wiring 27B to be connected to the split electrode 15 included among the at least three split electrodes 15 and not to be connected to the first wiring 27A and the driving circuit section 16, and the wiring expansion section 32 is provided in at least one of the first wiring 27A and the second wiring 27B. As a result, a signal is individually outputted to the first wiring 27A and the second wiring 27B from the driving circuit section 16. Accordingly, display at a larger number of gray scales than the number of bits can be performed.

The reflective electrode 12 is divided such that the number of the split electrodes 15 is three, and the split electrode 15 to be connected to the second wiring 27B is disposed to be sandwiched between the two split electrodes 15 to be connected to the first wiring 27A. In this way, respective centers of gravity of the gray scales are aligned when a signal is fed to only the first wiring 27A to selectively charge the two split electrodes 15 as connection targets and when a signal is fed to only the second wiring 27B to selectively charge the one split electrode 15 as a connection target. As a result, an excellent display quality is obtained.

The wiring expansion section 32 is provided in at least the first wiring 27A and is expanded toward the split electrode 15 to be connected to the second wiring 27B from the side of the split electrode 15 to be connected to the first wiring 27A. In this way, the wiring expansion section 32 can generate a sufficient electric field in the space S1 between the adjacent split electrodes 15 when a signal to be fed to the split electrode 15 from the driving circuit section 16 via the first wiring 27A is fed to itself.

The first wiring 27A includes the pair of wiring branch sections 29 extending to straddle the two split electrodes 15 as connection targets and the split electrode 15 to be connected to the second wiring 27B while being branched with the second wiring 27B sandwiched therebetween. The wiring expansion section 32 is provided to straddle the pair of wiring branch sections 29 in at least the first wiring 27A. In this way, the pair of wiring branch sections 29 is connected to the two split electrodes 15 as connection targets of the first wiring 27A. Thus, even if a disconnection or the like has occurred in either one of the wiring branch sections 29, a signal can be fed to the split electrode 15 by the remaining wiring branch section 29, resulting in excellent redundancy. The wiring expansion section 32 is provided to straddle the pair of wiring branch sections 29 branched to sandwich the second wiring 27B therebetween in the first wiring 27A. Accordingly, a coverage of the wiring expansion section 32 with respect to the space S1 provided between the adjacent split electrodes 15A and 15B becomes good. As a result, a sufficient electric field can be generated over a wider range in the space S1 between the adjacent split electrodes 15 so that a larger transmitted light amount in the space S1 can be ensured.

The wiring expansion section 32 is disposed to overlap the end of the split electrode 15 to be connected to the second wiring 27B. In this way, reliability with which the wiring expansion section 32 can be made to overlap the space S1 provided between the split electrode 15 to be connected to the first wiring 27A and the split electrode 15 to be connected to the second wiring 27B over the entire width becomes high. As a result, the above-described coverage of the wiring expansion section 32 with respect to the space S1 becomes better. Thus, a larger transmitted light amount in the space S1 can be ensured.

The wiring expansion section 32 is provided in at least the second wiring 27B and is expanded toward the split electrode 15 to be connected to the first wiring 27A from the side of the split electrode 15 to be connected to the second wiring 27B. In this way, the wiring expansion section 32 can generate a sufficient electric field in the space S1 between the adjacent split electrodes 15 when a signal to be fed to the split electrode 15 from the driving circuit section 16 via the second wiring 27B is fed to itself.

The first wiring 27A includes the pair of wiring branch sections 29 extending to straddle the two split electrodes 15 as connection targets and the split electrode 15 to be connected to the second wiring 27B while being branched to sandwich the second wiring 27B therebetween, and the second wiring 27B is composed of the same material as that for the first wiring 27A and is disposed to be spaced apart from the pair of wiring branch sections 29. In this way, the second wiring 27B is composed of the same material as that for the first wiring 27A while being spaced apart from the pair of wiring branch sections 29 branched to sandwich itself, to prevent a short circuit with the first wiring 27A. In such an arrangement, an arrangement space of the second wiring 27B is limited. In this respect, the second wiring 27B is provided with the wiring expansion section 32 to be expanded toward the split electrode 15 to be connected to the first wiring 27A from the side of the split electrode 15 to be connected to the second wiring 27B. Thus, an arrangement space of the second wiring 27B including the wiring expansion section 32 can be sufficiently ensured. As a result, a configuration for connecting the second wiring 27B to the split electrode 15 and the driving circuit section 16 can be designed with allowance.

The wiring expansion section 32 is disposed to overlap the end of the split electrode 15 to be connected to the first wiring 27A. In this way, reliability with which the wiring expansion section 32 can be made to overlap the space S1 provided between the split electrode 15 to be connected to the first wiring 27A and the split electrode 15 to be connected to the second wiring 27B over the entire width becomes high. As a result, the above-described coverage of the wiring expansion section 32 with respect to the space S1 becomes better so that a larger transmitted light amount in the space S1 can be ensured.

Second Embodiment

A second embodiment of the technology described herein will be described with reference to FIG. 6 and FIG. 7. In the second embodiment, a modification of an arrangement of reflective electrodes 112 is illustrated. An overlapping description is omitted for a similar structure, function, and effect to those in the above-described first embodiment.

Figure 6:
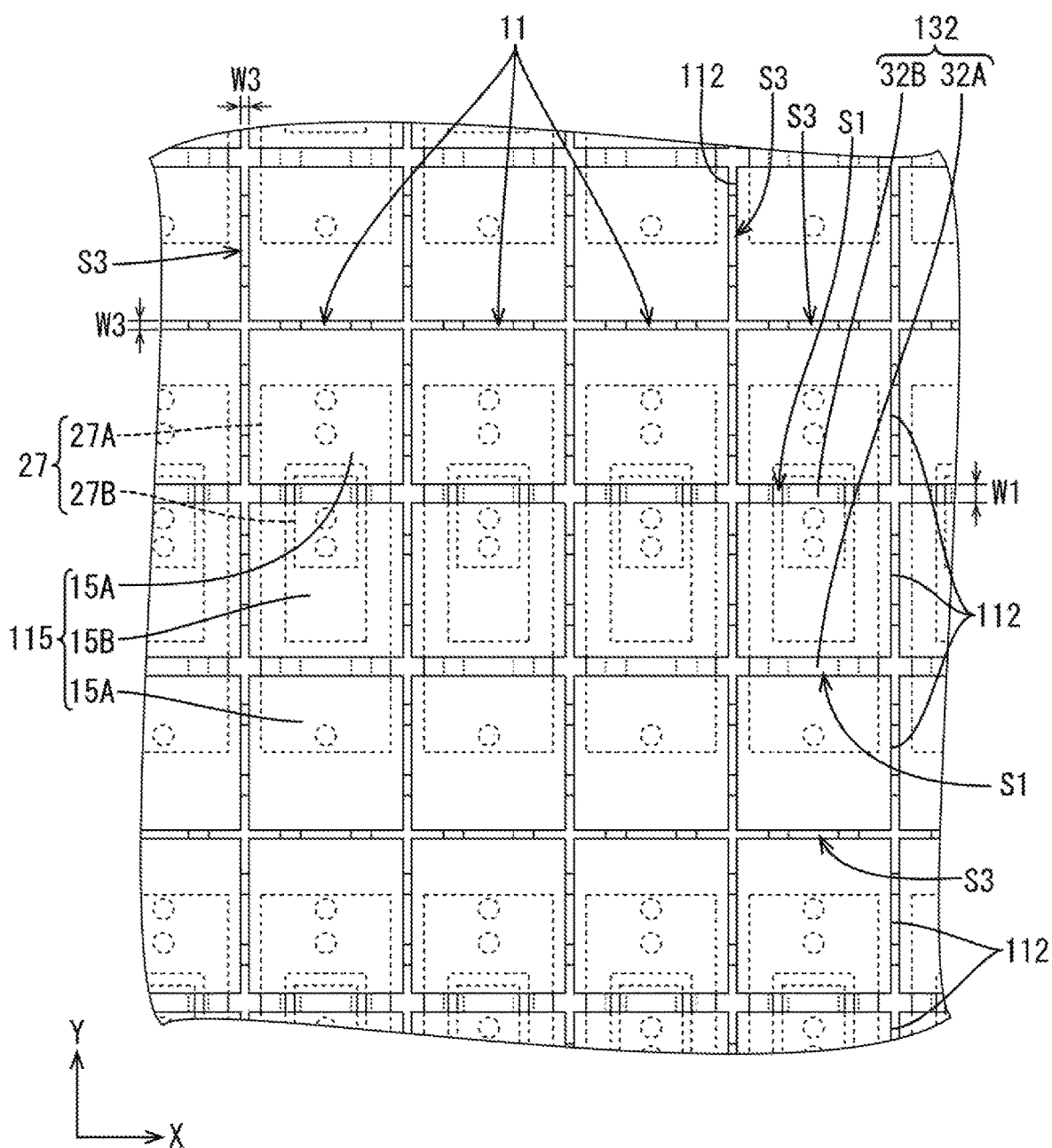
FIG. 6 is a plan view illustrating an arrangement of pixel sections in an array substrate constituting a semi-transmissive liquid crystal display device according to a second embodiment.
Figure 7:
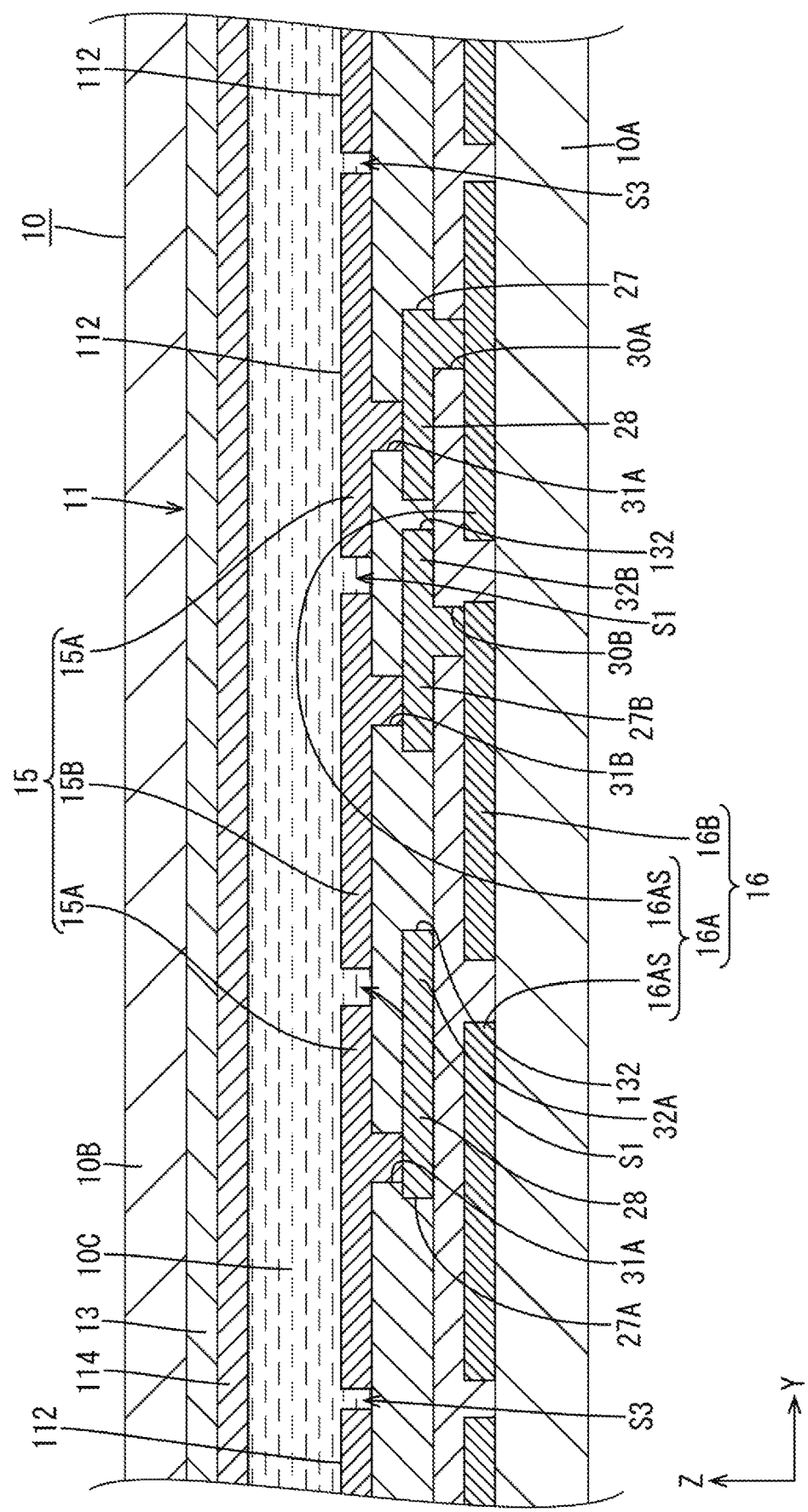
FIG. 7 is a cross-sectional view taken along a line A-A illustrated in FIG. 6.

The reflective electrodes 112 according to the present embodiment are disposed such that respective spaces (second spaces) S3 between the reflective electrode 12 and the adjacent reflective electrodes 112 in an X-axis direction and a Y-axis direction are narrower than a space S1 included in the one reflective electrode 112 and between adjacent split electrodes 115, as illustrated in FIG. 6 and FIG. 7. That is, the space S1 included in the one reflective electrode 112 and between the adjacent split electrodes 115 is wider than the space S3 between the adjacent reflective electrodes 112, and a width dimension W1 of the space S1 is larger than a width dimension W3 of the space S3. As described in the above first embodiment, a wiring expansion section 132 is arranged to overlap the space S1 between the adjacent split electrodes 115. Therefore, a transmitted light amount in the vicinity of the space S1 tends to be larger due to an electric field occurring between the wiring expansion section 132 and a counter electrode 114, as compared with that in the space S3 which the wiring expansion section 132 is not arranged to overlap. Therefore, when the space S1 between the split electrodes 115 in which the transmitted light amount is relatively large is made wider than the space S3 between the reflective electrodes 112 in which the transmitted light amount is relatively small, a larger transmitted light amount can be ensured. As a result, a display quality at the time of transmissive display is further improved.

As described above, according to the present embodiment, the plurality of reflective electrode 112 are disposed side by side with the spaces (second spaces) S3, which transmits light, respectively provided thereamong and are configured such that the space S1 between the adjacent split electrodes 115 is wider than the space S3 between the adjacent reflective electrodes 112. As described above, in the space S1 between the adjacent split electrodes 115, a larger transmitted light amount is ensured due to the wiring expansion section 132 being provided, as compared with that in the space S3 between the adjacent reflective electrodes 112. Therefore, when the space S1 between the split electrodes 115 in which the transmitted light amount is relatively large is made wider than the space S3 between the reflective electrodes 112 in which the transmitted light amount is relatively small, a much larger transmitted light amount can be ensured. As a result, a display quality at the time of transmissive display is further improved.

Third Embodiment

A third embodiment of the present invention will be described with reference to FIG. 8. In the third embodiment, a modification of a wiring expansion section 232 from that in the above-described first embodiment is illustrated. An overlapping description is omitted for a similar structure, function, and effect to those in the above-described first embodiment.

Figure 8:
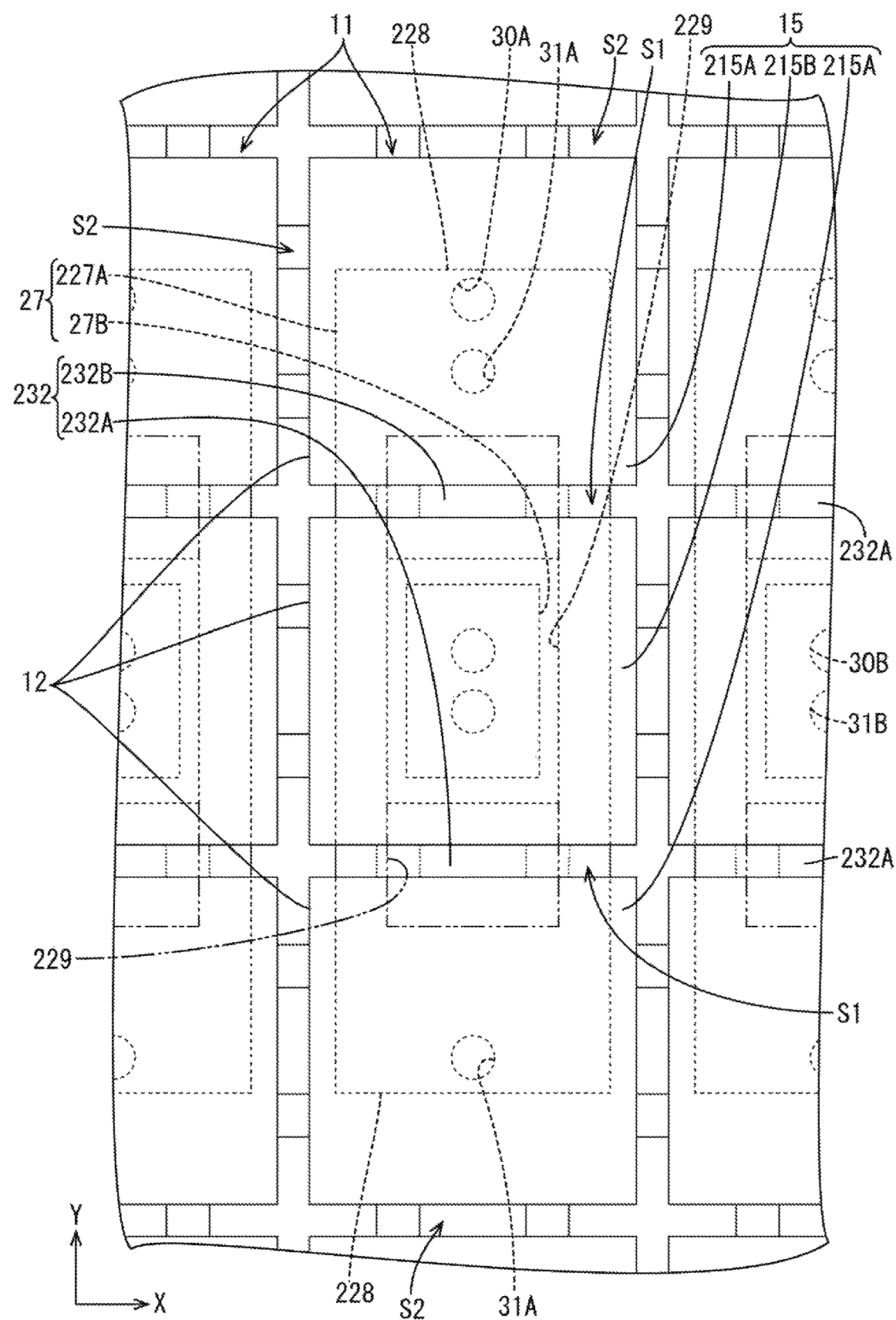
FIG. 8 is an enlarged plan view illustrating an arrangement of pixel sections in an array substrate constituting a semi-transmissive liquid crystal display device according to a third embodiment.

The wiring expansion sections 232 according to the present embodiment is exclusively provided in a first wiring 227A, as illustrated in FIG. 8. That is, the wiring expansion section 232 includes a first wiring expansion section 232A connecting with one of electrode connection sections 228 and a pair of wiring branch sections 229 in the first wiring 227A and a first wiring expansion section 232A connecting with the other electrode connection section 228 and the pair of wiring branch sections 229 in the first wiring 227A. The two first wiring expansion sections 232A are disposed to respectively overlap two spaces S1 between two first split electrodes 215A and a second split electrode 215B. Accordingly, the first wiring 227A has a vertically symmetrical planar shape as a whole. In the present embodiment, the second wiring expansion section 32B (see FIG. 4) described in the above-described first embodiment is omitted.

Fourth Embodiment

A fourth embodiment of the technology described herein will be described with reference to FIG. 9. In the fourth embodiment, a modification of a wiring expansion section 332 from that in the above-described first embodiment is illustrated. An overlapping description is omitted for a similar structure, function, and effect to those in the above-described first embodiment.

Figure 9:
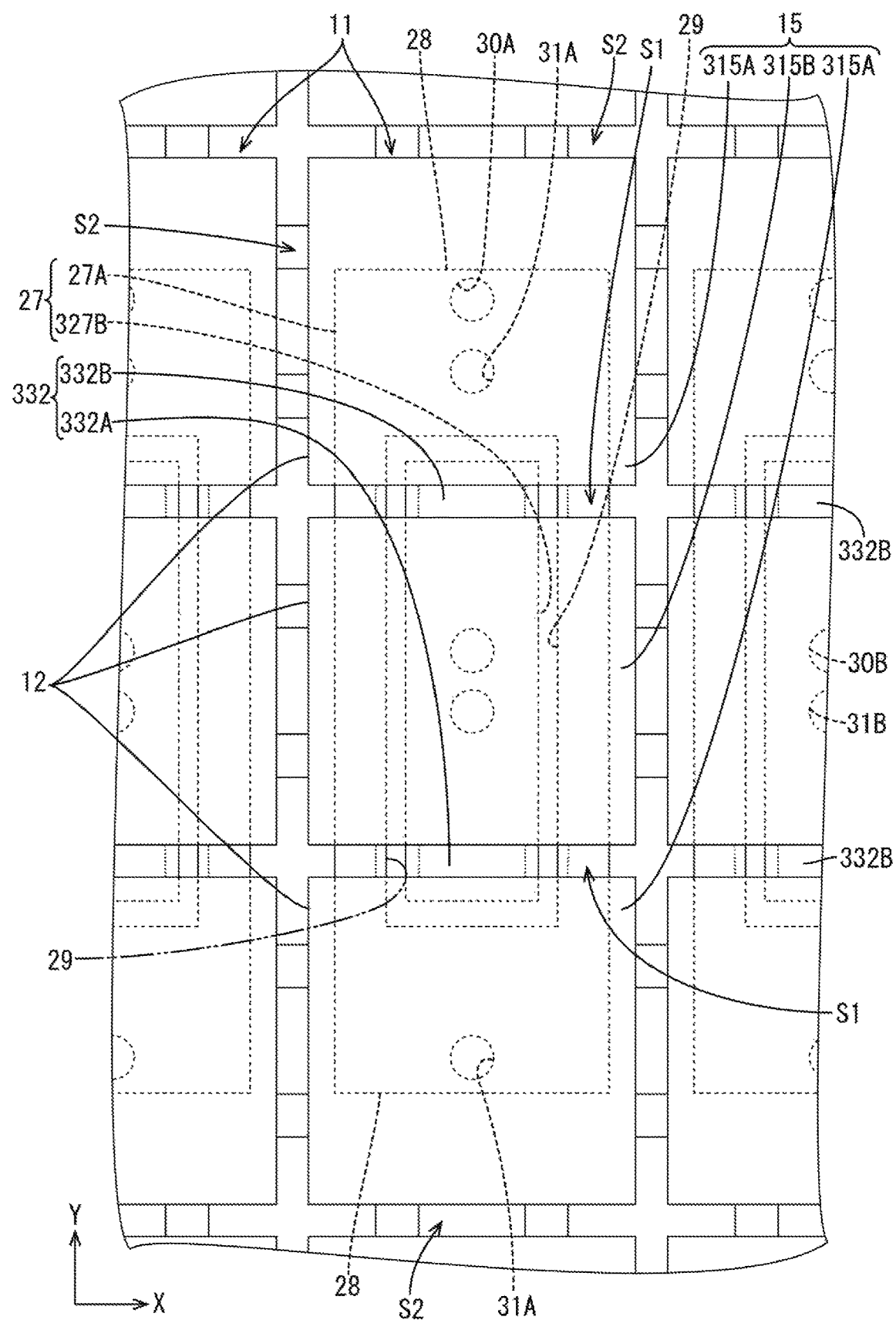
FIG. 9 is an enlarged plan view illustrating an arrangement of pixel sections in an array substrate constituting a semi-transmissive liquid crystal display device according to a fourth embodiment.

The wiring expansion sections 332 according to the present embodiment is exclusively provided in a second wiring 327B, as illustrated in FIG. 9. That is, the wiring expansion section 332 includes a second wiring expansion section 332B connecting with one end in a Y-axis direction of the second wiring 327B and a second wiring expansion section 332B connecting with the other end in the Y-axis direction of the second wiring 327B. The two second wiring expansion sections 332B are disposed to respectively overlap two spaces S1 between two first split electrodes 315A and a second split electrode 315B. Accordingly, the second wiring 327B has a vertically symmetrical planar shape as a whole. In the present embodiment, the first wiring expansion section 32A (see FIG. 4) described in the above-described first embodiment is omitted.

Other Embodiments

The technology described herein is not limited to the embodiments described by the above-described description and drawings, but embodiments, described below, for example, are included in a technical scope of the technology described herein.

(1) Although a case where reliability with which the wiring expansion section is arranged to overlap the space between the adjacent split electrodes over the entire width by being arranged to overlap the end of the split electrode is ensured has been illustrated in each of the above-described embodiments, an arrangement in which a wiring expansion section does not overlap an end of a split electrode can also be adopted.

(2) Although a case where the wiring expansion section is arranged to overlap the space between the adjacent split electrodes over the entire width has been illustrated in each of the above-described embodiments, an arrangement in which a wiring expansion section partially overlaps a space between adjacent split electrodes in its width direction may also be adopted.

(3) Although a case where the first wiring expansion section is provided to straddle the pair of wiring branch sections constituting the first wiring has been illustrated in the above-described first to third embodiments, a first wiring expansion section may be configured to connect with one of wiring branch sections but not to connect with the other wiring branch section. The first wiring expansion section may be configured not to connect with an electrode connection section constituting a first wiring.

(4) Although a case where the second wiring expansion section has the same width as that of the second wiring has been illustrated in the above-described first, second, and fourth embodiments, a second wiring expansion section may be wider or narrower than a second wiring.

(5) In addition to the description in the above-described first embodiment, a specific circuit configuration of a driving circuit section can be appropriately changed.

(6) Although the above-described second embodiment has been described on the premise of "the configuration in which the wiring expansion section overlaps the space between the adjacent split electrodes" described in the first embodiment, the technology described herein is applicable, without being limited to, such a premise structure. That is, a semi-transmissive liquid crystal panel in which a wiring expansion section is not formed, but a transmitted light amount in a space between adjacent split electrodes tends to be larger than a transmitted light amount in a space between adjacent reflective electrodes enables a larger transmitted light amount in the space between the adjacent split electrodes to be ensured so that a display quality at the time of transmissive display can be improved if a configuration in which the space between the adjacent split electrodes is made wider than the space between the adjacent reflective electrodes is applied thereto. The semi-transmissive liquid crystal panel (a display device) in the case "includes a reflective electrode that is divided into a plurality of split electrodes arranged with spaces, which transmit light, respectively provided thereamong and reflects light, and is configured such that the reflective electrode includes a plurality of reflective electrodes disposed side by side with second spaces, which transmit light, respectively provided thereamong, and the space between the adjacent split electrodes is wider than the second space between the adjacent reflective electrodes".

(7) Although a case where the first wiring has a branch structure including the pair of wiring branch sections has been illustrated in each of the above-described embodiments, a first wiring may have an unbranched structure. Conversely, a first wiring may have a branch structure including three or more wiring branch sections.

(8) Although a case where the second wiring is arranged to be sandwiched between the pair of wiring branch sections constituting the first wiring has been illustrated in each of the above-described embodiments, an arrangement in which between one of wiring branch sections and a second wiring, the other wiring branch section is sandwiched can also be adopted.

(9) In addition to the above-described embodiments, an arrangement of contact holes for connecting a wiring, a driving circuit section, and a split electrode and the number of contact holes to be installed, for example, can be appropriately changed.

(10) Although a configuration in which the reflective electrode is divided into the three split electrodes has been illustrated as an example in each of the above-described embodiments, a reflective electrode can also be divided into four or more split electrodes.

(11) Although in each of the above-described embodiments, a case where the three split electrodes constituting the reflective electrode are of substantially the same size has been illustrated, three split electrodes can also include ones of different sizes. In the case, although the two first split electrodes are preferably of substantially the same size, the technology described herein is not necessarily limited to this.

(12) Although the semi-transmissive liquid crystal panel capable of color display because the color filter is included in the counter substrate has been illustrated as an example in each of the above-described embodiments, a semi-transmissive liquid crystal panel that performs monochrome display by omitting a color filter from a counter substrate may be adopted. The type of a specific color in a color filter may be changed without omitting the color filter from a counter substrate.

(13) Although the semi-transmissive liquid crystal panel made to have the normally black mode has been illustrated as an example in each of the above-described embodiments, a semi-transmissive liquid crystal panel made to have a normally white mode may be adopted.

(14) Although the semi-transmissive liquid crystal panel configured such that the liquid crystal layer is sandwiched between the pair of substrates has been illustrated as an example in each of the above-described embodiments, a display panel in which functional organic molecules other than a liquid crystal material are sandwiched between a pair of substrates may be adopted.

(15) An operation mode of a semi-transmissive liquid crystal panel may be any one of a VA (Vertical Alignment) mode, an IPS (In-Plane Switching) mode, and an FFS (Fringe Field Switching) mode.

The invention claimed is:

1. A display device comprising:
a set of reflective electrodes at least including a first electrode, a second electrode, and a third electrode that reflect light and are arranged with spaces through which light transmits, the second electrode being disposed between the first electrode and the third electrode;
a first driving circuit section driving the first electrode and the third electrode;
a second driving circuit section driving the second electrode;
a first wiring connected to the first electrode, the third electrode, and the first driving circuit section, the first wiring being composed of a conductive material having a light transmission property, the first wiring being not connected to the second electrode and the second driving circuit section, the first wiring including two wiring branch sections that extend to straddle the first electrode and the third electrode while crossing the spaces between the second electrode and each of the first electrode and the third electrode, the two wiring branch sections sandwiching a second wiring and the spaces therebetween;
the second wiring connected to the second electrode and the second driving circuit section, the second wiring being composed of the conductive material having a light transmission property;
a wiring expansion section extending from one of the first wiring and the second wiring to overlap one of the spaces between the two wiring branch sections.

2. The display device according to claim 1, wherein the first wiring includes electrode connection sections connected to the first electrode and the third electrode, respectively, and the first wiring includes the wiring expansion section extending from one of the electrode connection sections toward the second electrode.

3. The display device according to claim 2, wherein the wiring expansion section is provided to straddle the two wiring branch sections of the first wiring.

4. The display device according to claim 2, wherein the wiring expansion section is disposed to overlap an end portion of the second electrode connected to the second wiring.

5. The display device according to claim 1, wherein the second wiring includes an electrode connection section connected to the second electrode and includes the wiring expansion section extending from the electrode connection section toward one of the first electrode and the third electrode.

6. The display device according to claim 5, wherein the second wiring is composed of the conductive material same as that of the first wiring and is disposed to be spaced apart from the two wiring branch sections.

7. The display device according to claim 5, wherein the wiring expansion section extends from the electrode connection section of the second wiring toward the first electrode, the second wiring further includes another expansion section extending from the electrode connection section of the second wiring toward the third electrode, and the wiring expansion section overlaps an end portion of the first electrode and the other expansion section overlaps an end portion of the third electrode.

8. The display device according to claim 1, wherein the set of reflective electrodes includes sets of reflective electrodes, the sets of reflective electrodes are arranged with second spaces through which light transmits, and each of the spaces between the second electrode and each of the first and the third electrode is wider than each of the second spaces between the sets of reflective electrodes that are adjacent to each other.

9. The display device according to claim 1, wherein
the wiring expansion section includes a first wiring expansion section and a second wiring expansion section,
the first wiring includes electrode connection sections connected to the first electrode and the third electrode, respectively, and the first wiring includes the first wiring expansion section extending from one of the electrode connection sections toward the second electrode, and
the second wiring includes an electrode connection section connected to the second electrode and includes the second wiring expansion section extending from the electrode connection section toward one of the first electrode and the third electrode.

10. The display device according to claim 9, wherein
the set of reflective electrodes includes sets of reflective electrodes,
the sets of reflective electrodes are arranged with second spaces through which light transmits, and
each of the spaces between the second electrode and each of the first and the third electrode is wider than each of the second spaces between the sets of reflective electrodes that are adjacent to each other.

11. The display device according to claim 2, wherein
the first wiring further includes another expansion section extending from another one of the electrode connection sections of the first wiring toward the second electrode, and
the wiring expansion section overlaps an end portion of the second electrode and the other expansion section overlaps another end portion of the second electrode opposite from the end portion.

12. A display device comprising:
a set of reflective electrodes at least including three reflective electrodes that reflect light and are arranged with spaces through which light transmits, each of the spaces between adjacent two reflective electrodes among the three reflective electrodes having a width dimension extending from one of the adjacent two reflective electrodes to another one of the adjacent two reflective electrodes and having a length dimension same as a length dimension of an edge of each of the adjacent two reflective electrodes;
a driving circuit section driving the reflective electrodes;
a wiring connected to the set of reflective electrodes and the driving circuit section and composed of a conductive material having a light transmission property; and
a wiring expansion section extending from the wiring to overlap one of the spaces, wherein
the wiring and the wiring expansion section cover the one of the spaces over entire dimensions of the width dimension and the length dimension.

13. The display device according to claim 12, wherein
the set of reflective electrodes includes sets of reflective electrodes,
the sets of reflective electrodes are arranged with second spaces through which light transmits, and
each of the spaces between the adjacent two reflective electrodes is wider than each of the second spaces between the sets of reflective electrodes that are adjacent to each other.

* * * * *